US010028498B2

(12) United States Patent
Brooks et al.

(10) Patent No.: US 10,028,498 B2
(45) Date of Patent: Jul. 24, 2018

(54) MACHINE CONTROLLER ALLOWING CONCURRENT FUNCTIONS

(71) Applicant: CNH Industrial America, LLC., New Holland, PA (US)

(72) Inventors: Nathan Brooks, Manitowoc, WI (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 294 days.

(21) Appl. No.: 14/699,057

(22) Filed: Apr. 29, 2015

(65) Prior Publication Data
US 2016/0316739 A1 Nov. 3, 2016

(51) Int. Cl.
| | | |
|---|---|---|
| *A01M 7/00* | (2006.01) | |
| *A01B 73/06* | (2006.01) | |
| *G06F 13/362* | (2006.01) | |
| *G06F 3/041* | (2006.01) | |
| *A01B 76/00* | (2006.01) | |
| *G06F 3/038* | (2013.01) | |
| *G06F 9/451* | (2018.01) | |

(52) U.S. Cl.
CPC ......... *A01M 7/0089* (2013.01); *A01B 73/062* (2013.01); *A01B 76/00* (2013.01); *G06F 3/038* (2013.01); *G06F 9/451* (2018.02); *G06F 13/362* (2013.01); *G06F 2203/0381* (2013.01)

(58) Field of Classification Search
CPC .... A01B 73/062; A01B 76/00; A01M 7/0089; G06F 13/362; G06F 2203/0381; G06F 3/038; G06F 9/451
See application file for complete search history.

(56) References Cited

U.S. PATENT DOCUMENTS

| | | | |
|---|---|---|---|
| 5,755,382 A | * | 5/1998 | Skotinkov ............ A01B 51/026 180/411 |
| 5,978,720 A | | 11/1999 | Hieronymus et al. |
| 6,061,617 A | | 5/2000 | Berger et al. |
| 6,065,448 A | | 5/2000 | Hatton et al. |

(Continued)

FOREIGN PATENT DOCUMENTS

WO    2014095159 A1    6/2014

OTHER PUBLICATIONS

Case IH; Case IH AFS Pro Display website printout Apr. 8, 2015; http://www.caseih.com/northamerica/en-us/products/advanced-farming-systems/displays.

*Primary Examiner* — Abby Y Lin
*Assistant Examiner* — Paul A Castro
(74) *Attorney, Agent, or Firm* — Rebecca L. Henkel; Rickard K. DeMille

(57) ABSTRACT

A machine controller may communicate with a joystick (or grip) and/or a touchscreen Human Machine Interface (HMI) (or other input module) on first data communication bus or path, and communicate with machine specific control modules and/or a field computer on a second data communication bus or path. The machine controller may receive operator commands from the joystick or other input module and instruct the corresponding machine specific control module accordingly. Concurrently, the field computer may be used by the operator to monitor and/or control a different function of the machine via a different machine specific control module. As a result, the operator may keep his hand on the joystick or other input module while monitoring a different function.

12 Claims, 4 Drawing Sheets

(56) References Cited

U.S. PATENT DOCUMENTS

| | | | |
|---|---|---|---|
| 6,216,794 B1 * | 4/2001 | Buchl | A01B 63/00 |
| | | | 111/903 |
| 6,337,971 B1 | 1/2002 | Abts | |
| 6,477,611 B1 | 11/2002 | Chang | |
| 6,920,380 B2 | 7/2005 | McClure et al. | |
| 6,990,399 B2 | 1/2006 | Hrazdera et al. | |
| 7,496,441 B2 | 2/2009 | Brandt et al. | |
| 7,739,015 B2 | 6/2010 | Senneff et al. | |
| 8,504,255 B2 | 8/2013 | Colwell et al. | |
| 2003/0028296 A1 * | 2/2003 | Miller | B60R 16/0232 |
| | | | 701/32.7 |
| 2011/0255411 A1 * | 10/2011 | Isaac | H04L 12/4625 |
| | | | 370/241 |
| 2012/0004812 A1 | 1/2012 | Baumgarten et al. | |
| 2012/0229394 A1 * | 9/2012 | Ehrl | G05B 19/042 |
| | | | 345/173 |
| 2012/0253594 A1 | 10/2012 | Schreiber | |
| 2013/0201316 A1 * | 8/2013 | Binder | H04L 67/12 |
| | | | 348/77 |
| 2014/0053092 A1 | 2/2014 | Grevinga et al. | |
| 2014/0328357 A1 * | 11/2014 | Fredriksson | H04J 3/0614 |
| | | | 370/520 |
| 2015/0163992 A1 * | 6/2015 | Anderson | A01C 21/005 |
| | | | 701/50 |

* cited by examiner

MACHINE CONTROLLER ALLOWING CONCURRENT FUNCTIONS

FIELD OF THE INVENTION

The invention relates generally to agricultural product application equipment such as self-propelled sprayers and, in particular, to a control system for an agricultural machine which includes a machine controller operable to communicate between an input module on a first data communication bus and a machine specific control module on a second data communication bus.

BACKGROUND OF THE INVENTION

Agricultural machines, such as self-propelled agricultural sprayers, typically include a control system in which a plurality of machine specific control modules may be connected. The machine specific control modules are typically fixed to the machine and communicate using a "machine specific" protocol via a data communication bus, such as an International Organization for Standardization (ISO) 11898 Controller Area Network (CAN) bus. Machine specific control modules may include, for example, (1) an agricultural product rate application module, (2) an automatic steering module, (3) a sprayer boom height module and (4) a sprayer boom folding module. Each machine specific control modules may employ sensors and/or actuators on the machine to accomplish particular functions with respect to the machine. For example, an agricultural product rate application module may use sensors and/or actuators to control agricultural product rate application, an automatic steering module may use sensors and/or actuators to control automatic steering, a sprayer boom height module may use sensors and/or actuators to control sprayer boom height, and a sprayer boom folding module may use sensors and/or actuators to control sprayer boom folding.

To control machine specific control modules, an operator of the agricultural machine oftentimes connects a Virtual Terminal (VT) or field computer to the machine. The field computer allows the operator to monitor the controlled functions by communicating with the machine specific control modules. The field computer often includes a graphical display and keypad and/or touchscreen for sending commands to the modules. However, this arrangement typically requires the operator to have a field computer installed in order to take advantage of these functions. Also, this arrangement typically requires the operator to take his hand off of a joystick or other input module in the cab in order to operate the field computer. This results in an inconvenience for the operator.

SUMMARY OF THE INVENTION

It is desirable to provide a control system for an agricultural machine in which an operator may monitor and control machine specific control modules with a field computer while simultaneously controlling other machine specific control modules with a joystick or other input module. Accordingly, a machine controller may communicate with a joystick (or grip) and/or a touchscreen Human Machine Interface (HMI) (or other input module) on first data communication bus or path, and communicate with machine specific control modules and/or a field computer on a second data communication bus or path. The machine controller may receive operator commands from the joystick or other input module and instruct the corresponding machine specific control module accordingly. Concurrently, the field computer may be used by the operator to monitor and/or control a different function of the machine via a different machine specific control module. As a result, the operator may keep his hand on the joystick or other input module while monitoring the different function.

Accordingly, the machine controller is configured to communicate with and interact with the machine specific control modules. An action using an input module, such as the joystick, may be packaged and routed to the machine specific control modules on a separate data communication bus or path (which could in turn also route to the field computer).

As a result, this may improve safety and convenience by allowing the operator to keep a hand on an input module, such as the joystick, while maintaining optimal control over the machine. This also may allow at least a dual functionality by permitting the operator to functionally control one aspect of the machine with an input module, such as the joystick, while visually controlling another aspect of the machine with the field computer.

According to one aspect of the invention, a control system for an agricultural machine may include: an input module being configured to receive a command from an operator of the agricultural machine; a plurality of machine specific control modules connected to a data communication bus, each of the machine specific control modules being configured to control a different function of the agricultural machine; a field computer connected to the data communication bus, the field computer including a graphical display, the field computer being configured to communicate with each of the machine specific control modules to display respective functions of the agricultural machine; and a machine controller connected to the input module and the data communication bus. The machine controller may execute a program stored in a non-transient medium operable to: (a) receive a command from the input module relating to a function of the agricultural machine; and (b) instruct a machine specific control module to complete the command with respect to the function.

The machine specific control modules may be, for example, selected from the group consisting of an agricultural product rate application module, an automatic steering module, a sprayer boom height module and a sprayer boom folding module. Similarly, the function may be, for example, selected from the group consisting of agricultural product application, automatic steering, sprayer boom height and sprayer boom folding.

According to another aspect of the invention, a method for controlling an agricultural machine which includes an input module being configured to receive a command from an operator of the agricultural machine, a plurality of machine specific control modules connected to a data communication bus, each of the machine specific control modules being configured to control a different function of the agricultural machine, a field computer connected to the data communication bus, the field computer including a graphical display, the field computer being configured to communicate with the machine specific control modules to display respective functions of the agricultural machine, and a machine controller connected to the input module and the data communication bus, is provided. The method may include: (a) receiving a command from the input module relating to a first function of the agricultural machine; (b) instructing a first machine specific control module to complete the command with respect to the first function over the data communication bus; and (c) displaying to the field computer a second function of the agricultural machine from a second machine specific control module.

According to another aspect of the invention, an agricultural sprayer may include: a sprayer boom extending transversely relative to the agricultural sprayer; a joystick being configured to receive a command from an operator of the agricultural sprayer; a touchscreen HMI being configured to receive a command from an operator of the agricultural sprayer; a plurality of machine specific control modules connected to a data communication bus, each of the machine specific control modules being configured to control a different function of the agricultural sprayer; a field computer connected to the data communication bus, the field computer including a graphical display, the field computer being configured to communicate with the machine specific control modules to display respective functions of the agricultural sprayer; and a machine controller connected to the input module and the data communication bus. The machine controller may execute a program stored in a non-transient medium operable to: (a) receive a command from the joystick or the touchscreen HMI relating to a function of the agricultural sprayer; and (b) instruct a machine specific control module to complete the command with respect to the function.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
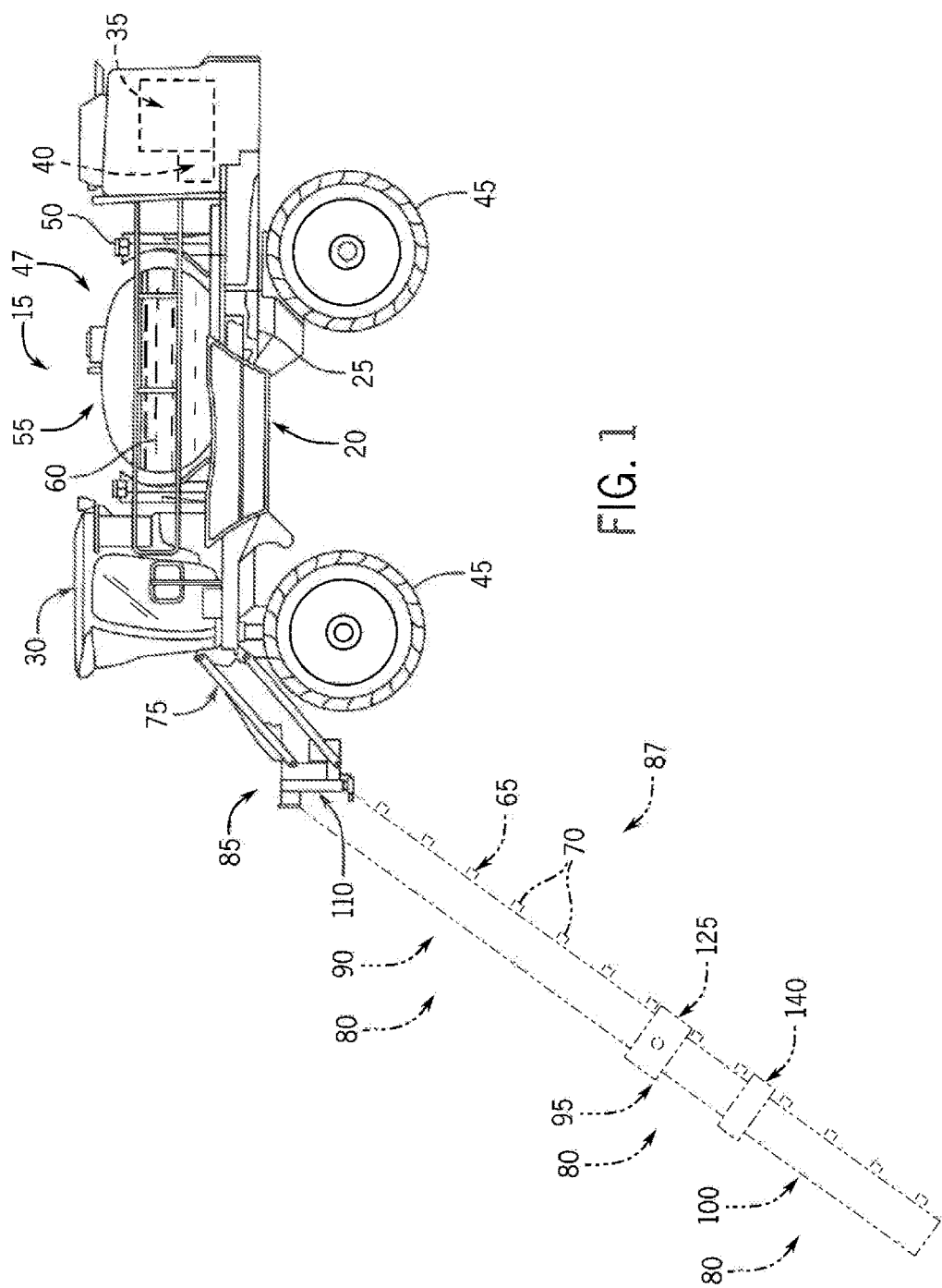
FIG. 1 is a side elevation of an exemplar agricultural machine according to the present invention.

Referring now to the drawings and specifically to FIG. 1, a control system, explained in greater detail elsewhere herein, is shown for use with an agricultural machine which may be an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can have either front-mounted or rear-mounted booms, such as those available from CNH Industrial, including the Miller Nitro and Condor Series sprayers and New Holland Guardian Series sprayers.

Still referring to FIG. 1, sprayer 15 includes chassis 20 having chassis frame 25 that supports various assemblies, systems, and components. These various assemblies, systems, and components include a cab 30, an engine 35 and hydraulic system 40. The hydraulic system 40 receives power from the engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating the wheels 45. In mechanical drive applications, a mechanical transmission receives power from the engine 35 and delivers power for rotating the wheels 45 by way of power-transmitting driveline components such as drive shafts, differentials, and other gear sets in portal, drop boxes, or other housings. A spray system 47 includes storage containers such as rinse tank 50 storing water or a rinsing solution and a product tank 55 that stores a volume of product 60 for delivery onto an agricultural field with sprayer 15. A product delivery pump conveys product 60 from product tank 55 through plumbing components such as interconnected pieces of tubing and through a boom tubing system 65 for release out of spray nozzles 70 that are spaced from each another along the width of boom 7 during spraying operations of sprayer 15. Groups or banks of multiple adjacent spray nozzles 70 define multiple spray sections 72 of spray system 47. Spray sections 72 are defined along boom 7 and selectively deliver product 60 for release onto an agricultural field at locations corresponding to positions of activated spray sections 72. Boom 7 is connected to chassis 20 with lift arm assembly 75 that is configured to move the boom 7 up and down for adjusting the height of application of the product 60.

Figure 2:
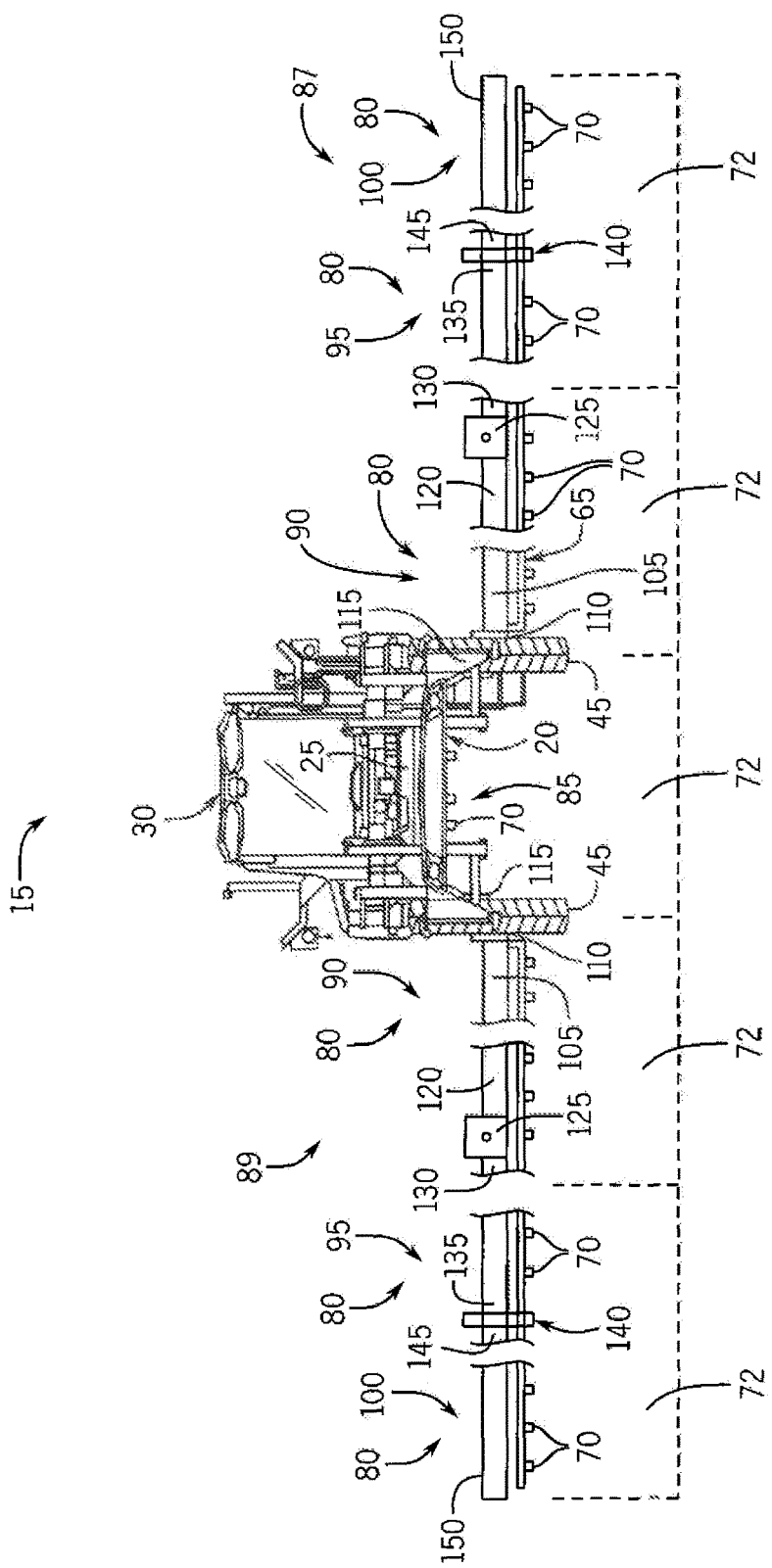
FIG. 2 is a front elevation of the agricultural machine of FIG. 1.

Referring now to FIG. 2, boom 7 includes multiple boom segments 80 connected longitudinally to provide the corresponding width of the assembled boom 7. Boom segments 80 include center section 85 and left and right boom arms 87, 89 extending in opposite directions from center section 85. Left and right boom arms 87, 89 have multiple segments with pairs of primary boom segments 90, secondary boom segments 95, and breakaway boom segments 100 extending in opposite directions along the respective left and right boom arms 87, 89, mirrored about a longitudinal axis of the sprayer 15. The corresponding left and right segments of the pairs of primary, secondary, and breakaway boom segments 90, 95, 100 are substantially identical, so only one will be described, with the description applying to both the left and right segments of left and right boom arms 87, 89. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 7 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended position during collisions with the crops, the ground, and/or other obstacles. Breakaway boom segment 100 extends from breakaway boom inner end 145 away from secondary boom segment 95 to breakaway boom outer end 150. In the stored, position of boom 7, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15

Figure 3:
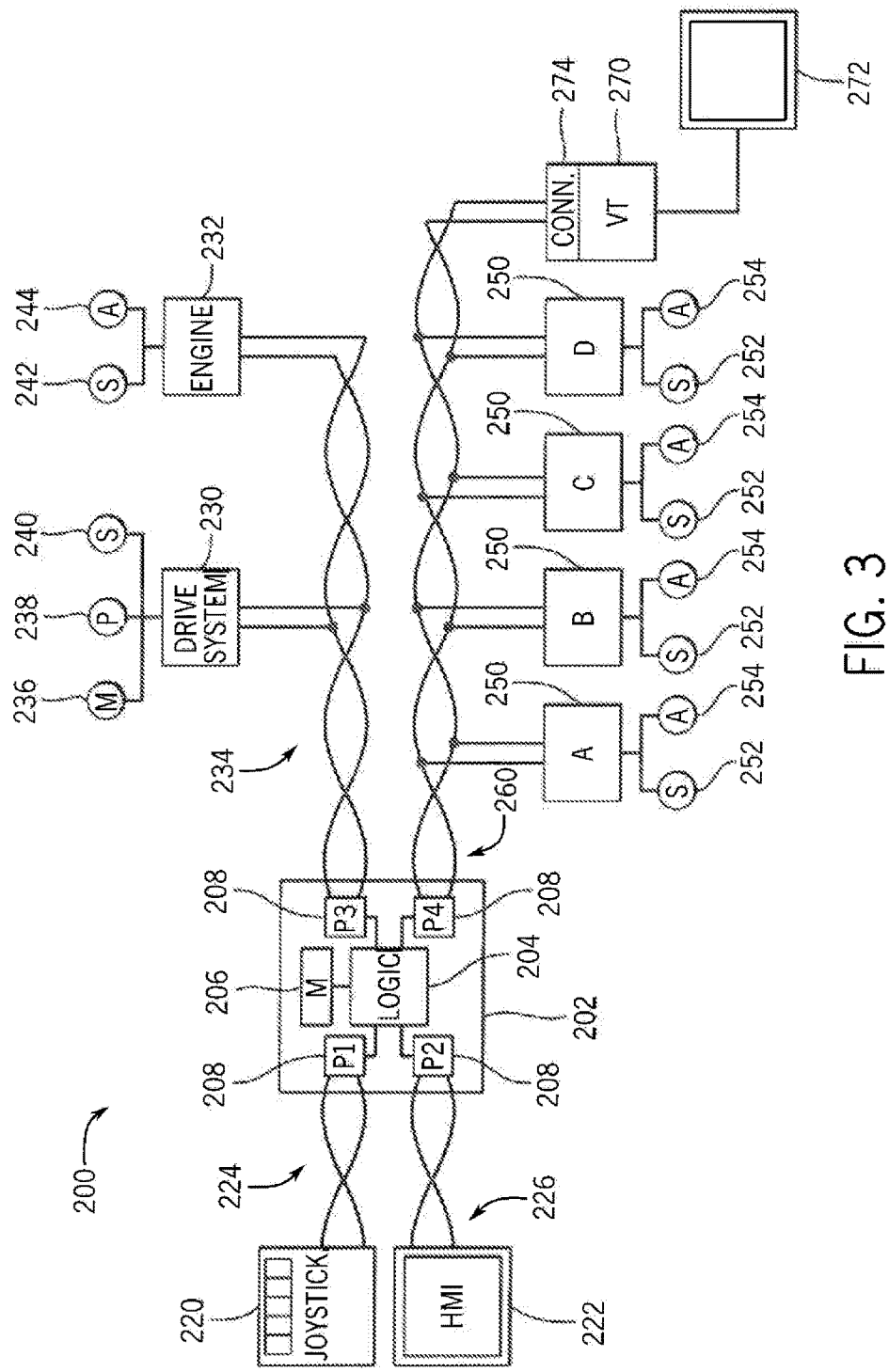
FIG. 3 is a simplified schematic of a control system for the machine of FIGS. 1 and 2 according to the present invention.

Referring now to FIG. 3, a simplified schematic of a control system 200 for the sprayer 15 is provided in accordance with the present invention. The control system 200 includes a machine controller 202 which may comprise logic or processing element 204, a memory 206 and a plurality of ports 208, such as ports "P1," "P2," "P3" and "P4." Each of the ports 208 may be electrically and logically configured to communicate according to one of various Controller Area Network (CAN) bus interface protocols, including for example Society of Automotive Engineers (SAE) J1939, International Organization for Standardization (ISO) 11783 (ISOBUS), ISO 11898, and the like, whose specifications are published and whose protocols are used broadly by a number of manufacturers and suppliers, including CNH Industrial. Accordingly, each of the ports 208 may receive inbound commands from and send outbound instructions to one or more devices connected to the respective port.

In the control system 200, one or more input modules may be connected to the machine controller 202, such as via the ports 208. The input modules may be positioned in the cab 30 such that they may be used to receive commands from an operator of the sprayer 15 for affecting various functions with respect to the machine. For example, a joystick 220 (or grip) may be a first input module connected to P1, and a touchscreen Human Machine Interface (HMI) 222 may be a second input module connected to P2. The joystick 220 may consist of a stick that pivots or otherwise moves along a base and sends a corresponding angle or direction as a command to the respective port. The joystick 220 may also include a plurality of buttons or switches for providing additional commands to the respective port. The touchscreen HMI 222 may consist of a graphical user interface allowing display of one or more functions of the agricultural machine while also permitting commands to the respective port by an operator touching the screen. The joystick 220 may be connected, for example, to port P1, such as via a first data communication bus 224 or path which could be a CAN bus implementing SAE J1939 via twisted pair cabling. Similarly, the touchscreen HMI 222 may be connected, for example, to port P2 via a second data communication bus 226 or path which could be a CAN bus implementing SAE J1939 via twisted pair cabling. However, in alternative arrangements, the joystick 220 and/or the touchscreen HMI 222 could be connected on the same data communication bus, or on different types of communication interfaces or paths, within the scope of the present invention.

In the control system 200, the machine controller 202 may also be connected to a hydrostatic drive system interface 230 and an engine interface 232. The machine controller 202 may connect to both the hydrostatic drive system interface 230 and the engine interface 232, for example, via a third data communication bus 234 connected to port P3 which could be a CAN bus implementing SAE J1939 via twisted pair cabling. The hydrostatic drive system interface 230 may, in turn, connect to one or more motors 236, pumps 238 and/or sensors 240 for affecting hydrostatic drive operation for the sprayer 15. Similarly, the engine interface 232 may, in turn, connect to one or more sensors 242 and/or actuators 244 for affecting engine operation for the sprayer 15.

Accordingly, commands provided by an operator in the cab 30, such as via the joystick 220, the touchscreen HMI 222, a steering wheel (not shown) or other input module, may be received by the machine controller 202 and routed to the corresponding system interface on the third data communication bus 234, such as to the hydrostatic drive system interface 230 or the engine interface 232. For example, moving the joystick 220 may result in sending a command to the machine controller 202, which, in turn, may result in the machine controller 202 sending an instruction to the engine interface 232 to adjust speed.

The machine controller 202 also advantageously connects to a plurality of machine specific control modules 250, such as modules "A," "B," "C" and "D." Each of the machine specific control modules 250 may connect to the machine controller, for example, via a fourth data communication bus 260 connected to port P3, which could be a CAN bus implementing machine specific protocol via ISO 11783 twisted pair cabling. Each of the machine specific control modules 250 may be configured to control a different function of the agricultural machine. For example, (1) module A may be an agricultural product rate application module, which may control an agricultural product application function; (2) module B may be an automatic steering module, which may control an automatic steering function; (3) module C may be a sprayer boom height module, which may control a sprayer boom height adjustment function; and (4) module 13 may be a sprayer boom folding module, which may control a sprayer boom folding function. Accordingly, each of the machine specific control modules 250 may connect, in turn, to one or more sensors 252 and/or actuators 254 disposed on the sprayer 15 for accomplishing the respective function.

A Virtual Terminal (VT) or field computer 270 may also be connected to the fourth data communication bus 260 for communication with the modules "A," "B," "C" and "D." The field computer 270 could be a mobile computing system including a graphical display 272 for accomplishing various farming related functions and may be connectable to the fourth data communication bus 260 via a connector 274. The field computer 270 could be, for example, an Advanced Farming Systems Pro 700 as available from CNH industrial. An operator in the cab 30 may use the field computer 270 to display functions of the agricultural machine as controlled by the modules "A," "B," "C" and "D." For example, on a first screen page provided to the display 272, the field computer 270 could provide monitoring and control with respect to agricultural product application via module A. Similarly, on a second screen page provided to the display 272, the field computer 270 could provide monitoring and control with respect to automatic steering via module B, and so forth.

The processing element 204 of the machine controller 202 may execute a program stored in the memory 206, which could be a Random Access Memory (RAM), Flash memory, Read Only Memory (ROM), or other non-transient medium, to receive commands from input modules relating to functions of the sprayer 15, and instruct corresponding machine specific control modules 250 to complete the commands with respect to the functions. For example, a button on the joystick 220 may correspond to a command for adjusting agricultural product application. Accordingly, an operator pressing the button may send a command from the joystick 220, which command, is then received by the machine controller 202. The machine controller 202 may then, in turn, send a corresponding instruction to the associated module, such as module A, to adjust the agricultural product rate application accordingly. In addition, substantially concurrently therewith, the field computer 270 may be operable to display, via the display 272, a separate function of the sprayer 15, such as sprayer boom height adjustment from module C. As a result, an operator could monitor sprayer boom height (via the field computer 270 and the display 272) while adjusting agricultural product rate application (via the joystick 220) without taking his hand off of the joystick 220.

In addition, a second input module, such as the touchscreen HMI 222, could also be used substantially concurrently to send another command to control yet another function. For example, touching an area of the touchscreen HMI 222 on a first screen may correspond to a command for adjusting automatic steering. Accordingly, an operator touching the touchscreen HMI 222 in the particular area may send another command which is received by the machine controller 202. The machine controller 202 may then, in turn, send a corresponding instruction to the correct module, such as module B, to adjust automatic steering accordingly. Accordingly, first and second functions (adjusting agricultural product application and adjusting automatic steering) may be controlled substantially concurrently with controlling and/or monitoring a third function (sprayer boom height adjustment).

Figure 4:
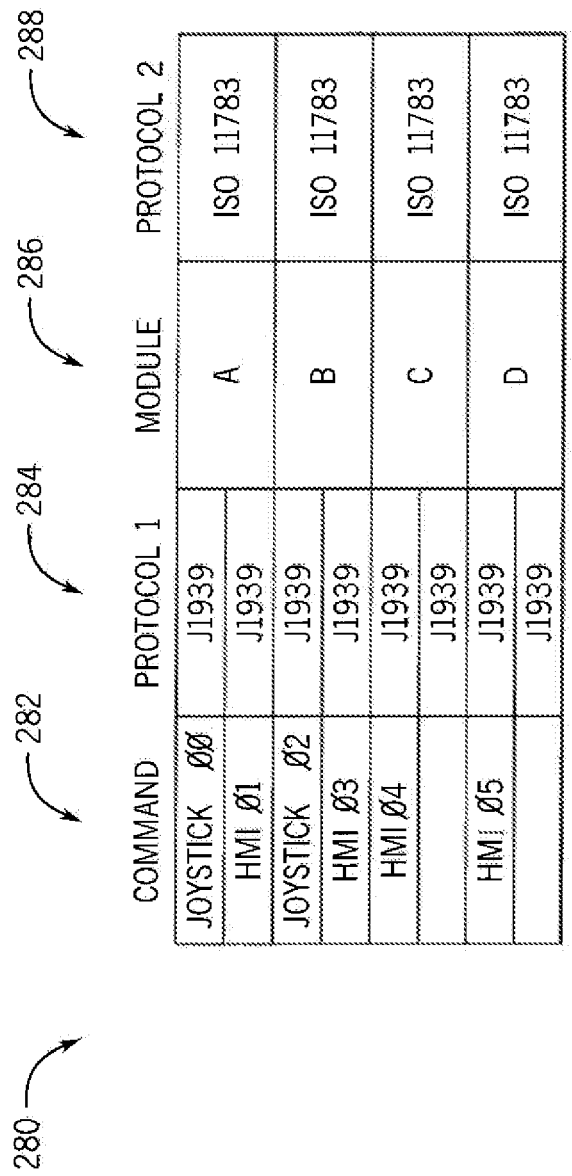
FIG. 4 is a data structure for the control system of FIG. 2 which relates input module commands to machine specific control modules.

Referring now to FIG. 4, a data structure 280 for the control system 200 relates input module commands to machine specific control modules 250 according to the present invention. The data structure 280 may be programmed and stored in the memory 206, such as in Flash Memory or firmware. The data structure 280 may relate commands from input modules (first column 282), first communications protocols corresponding to the input modules (second column 284), corresponding machine specific control modules with port information/addressing (third column 286), and second communications protocols corresponding to the machine specific control modules (fourth column 288). Accordingly, the processing element 204 may receive a command from an input device in a first protocol, reformat as an instruction according to a second protocol as needed, and route to the instruction, to the associated machine specific control module.

For example, a first joystick command denoted "Joystick 00" (which could correspond to a particular joystick button for controlling agricultural product application) may be associated with the joystick 220 connected to a communication path implementing J1939. The Joystick 00 command may be predetermined to associate with module A (agricultural product rate application module), which module may be connected to a communication path implementing ISO 11898. Accordingly, upon receiving a command from the joystick 220 corresponding to the Joystick 00 command, the machine controller 202, via the processing element 204, may operate reformat the command as an ISO 11898 instruction, and operate to route the instruction to module A relating to the corresponding function.

Many changes and modifications could be made to the invention without departing from the spirit thereof. The scope of these changes will become apparent from the appended claims.

We claim:

1. A control system for an agricultural machine, the agricultural machine including at least two of a sprayer for distributing an agricultural product at an operator controllable rate, a steering system for steering the agricultural machine along a user controllable path, a foldable sprayer boom supporting the sprayer above a supporting surface and being movable between a folded configuration and an unfolded configuration, and a boom height adjustment mechanism for adjusting a height of the sprayer boom relative to the supporting surface to an operator desired height, comprising:

a joystick having at least two user-selectable devices and being movable between a plurality of positions by an operator, wherein each selection device corresponds to one of the sprayer, the steering system, the sprayer boom and the boom height adjustment mechanism wherein each selection device corresponds to a different one of the sprayer, the steering system, the sprayer boom and the boom height adjustment mechanism, and wherein with one of the user-selectable selection device selected by an operator the position of the joystick generates a command signal for one of the sprayer, the steering system, the sprayer boom and the boom height adjustment mechanism;

a machine controller:
  operatively connected to the joystick for receiving the command signal therefrom;
  operatively connected to the at least two of the sprayer, the steering system, the sprayer boom and the boom height adjustment mechanism, the machine controller transmitting an instruction to one of the sprayer, the steering system, the sprayer boom and the boom height adjustment mechanism to which the machine controller is operatively connected in response to the command signal; and a graphical display operatively connected to the machine controller and being configured to display information regarding operation of the at least two of the sprayer, the steering system, the sprayer boom and the boom height adjustment mechanism;

wherein:
  the operator controllable rate is set in response to receipt of the instruction by the sprayer; the user controllable path is set in response to receipt of the instruction by the steering system;
  the sprayer boom is moved to one of the folded configuration and an unfolded configuration in response to receipt of the instruction by the sprayer boom; and
  the operator desired height of the sprayer boom relative to the supporting surface is set in response to receipt of the instruction by the boom height adjustment mechanism.

2. The control system of claim 1, further comprising an input device operatively connected to the machine controller and configured to selectively transmit a second command signal in response to an operator input, wherein the machine controller transmits a second instruction to one of the sprayer, the steering system, the sprayer boom and the boom height adjustment mechanism to which the machine controller is operatively connected in response to the second command signal.

3. The control system of claim 2, wherein the input device includes a touchscreen Human Machine Interface (HMI).

4. The control system of claim 1, wherein machine controller is operatively connected to a data communication bus, the data communication bus being twisted pair cabling.

5. The control system of claim 1, wherein machine controller is operatively connected to a data communication bus, the data communication bus being an ISO 11898 Controller Area Network (CAN) bus.

6. The control system of claim 1, wherein the machine controller is operatively connected to the joystick via twisted pair cabling.

7. The control system of claim 1, wherein the machine controller is operatively connected to the joystick via a J1939 bus.

8. A method for controlling an agricultural machine including at least two of a sprayer for distributing an agricultural product at an operator controllable rate, a steering system for steering the agricultural machine along a user controllable path, a foldable sprayer boom supporting the sprayer above a supporting surface and being movable between a folded configuration and an unfolded configuration, and a boom height adjustment mechanism for adjusting a height of the sprayer boom relative to the supporting surface to an operator desired height, the method comprising the steps of:
  selecting one of at least two user-selectable selections devices on a joystick, each selection device corresponds to one of the sprayer, the steering system, the sprayer boom and the boom height adjustment mechanism wherein each selection device corresponds to a different one of the sprayer, the steering system, the sprayer boom and the boom height adjustment mechanism;
  moving the joystick to one of a plurality of positions;
  generating a command signal in response to the moving of the joystick to one of the plurality of positions and the selected one of at least two user-selectable selection devices on the joystick;
  transmitting the command signal to a machine controller, the machine controller generating an instruction in response to the command signal received;
  transmitting the instruction to one of the sprayer, the steering system, the sprayer boom and the boom height adjustment mechanism to which the machine controller is operatively connected;
  setting the operator controllable rate in response to receipt of the instruction by the sprayer;
  setting the user controllable path in response to receipt of the instruction by the steering system;
  moving the sprayer boom to one of the folded configuration and an unfolded configuration in response to receipt of the instruction by the sprayer boom; and
  setting the operator desired height of the sprayer boom relative to the supporting surface in response to receipt of the instruction by the boom height adjustment mechanism.

9. The method of claim 8, further comprising:
  operatively connecting an input device to the machine controller;
  transmitting a second command signal to the machine controller in response to an operator input on the input device;
  generating a second instruction in response to the second command signal; and
  transmitting a second instruction to one of the sprayer, the steering system, the sprayer boom and the boom height adjustment mechanism to which the machine controller is operatively connected.

10. An agricultural sprayer, comprising:
  a sprayer for distributing, an agricultural product at an operator controllable rate;
  a sprayer boom extending transversely relative to the agricultural sprayer and supporting the sprayer, the sprayer boom being movable between a folded configuration and an unfolded configuration;
  a boom height adjustment mechanism for adjusting a height of the sprayer boom relative to a supporting surface to an operator desired height;
  a joystick having at least two user-selectable selection devices and being movable between a plurality of positions by an operator, wherein each selection device corresponds to one of the sprayer, the sprayer boom and the boom height adjustment mechanism wherein each selection device corresponds to a different one of the sprayer, the steering system, the sprayer boom and the boom height adjustment mechanism, and wherein the joystick is configured to receive a command from an operator of the agricultural sprayer, the joystick generating a first command signal in response to one of the at least two user-selectable selection devices being selected by the operator and the command from the operator;
  a touchscreen Human Machine Interface (HMI) being configured to receive a command from an operator of the agricultural sprayer, the HMI generating a second command signal in response to the command from the operator;
  a machine controller operatively connected to the joystick, the touchscreen HMI, the sprayer, the sprayer boom and the boom height adjustment mechanism, the machine controller executing a program stored in a non-transient medium operable to:
    generate a first instruction in response to the first command signal;
    generate a second instruction in response to the second command signal;
    transmit the first instruction to one of the sprayer, the sprayer boom and the boom height adjustment mechanism; and
    transmit the second instruction to one of the sprayer, the sprayer boom and the boom height adjustment mechanism;
  wherein:
    the operator controllable rate is set in response to receipt of at least one of the first and second instructions by the sprayer;
    the sprayer boom is moved to one of the folded configuration and an unfolded configuration in response to receipt of at least one of the first and second instructions by the sprayer boom; and
    the operator desired height of the sprayer boom relative to the supporting surface is set in response to receipt of at least one of the first and second instructions by the boom height adjustment mechanism.

11. The agricultural sprayer of claim 10, wherein the machine controller is operatively connected to a data communication bus, the data communication has being an ISO 11898 Controller Area Network (CAN) bus implemented via twisted pair cabling.

12. The agricultural sprayer of claim 11, wherein the joystick and the touchscreen HMI are operatively connected to the machine controller via separate J1939 buses.

* * * * *